June 16, 1936. E. C. RANEY 2,044,736
CONTROL APPARATUS
Filed Jan. 23, 1936 3 Sheets-Sheet 1

INVENTOR
Estel C. Raney
BY
Donald B. Waite
ATTORNEY

June 16, 1936.  E. C. RANEY  2,044,736
CONTROL APPARATUS
Filed Jan. 23, 1936   3 Sheets-Sheet 2

INVENTOR
Estel C. Raney
BY
ATTORNEY

June 16, 1936.  E. C. RANEY  2,044,736
CONTROL APPARATUS
Filed Jan. 23, 1936   3 Sheets-Sheet 3

INVENTOR
Estel C. Raney
BY
Donald B. Waite
ATTORNEY

Patented June 16, 1936

2,044,736

UNITED STATES PATENT OFFICE 2,044,736

CONTROL APPARATUS

Estel C. Raney, Columbus, Ohio, assignor to The Automatic Reclosing Circuit Breaker Company, Columbus, Ohio Application January 23, 1936, Serial No. 60,446

26 Claims. (Cl. 200—83)

The present invention relates to controllers and particularly to switches for controlling the starting and stopping of a compressor of a refrigerating system.

In such a system it is desirable to provide an adjustment so that an unskilled person may adjust the system to select temperatures within a predetermined range. The temperature within the refrigerator cabinet can be varied by controlling the duration of operation of the compressor of the system. The compressor is usually operated by an electric motor and it is started and stopped by electric switch responsive to either the temperature of the evaporator or the temperature in the refrigerator cabinet. The extent to which an unskilled person can adjust temperature conditions or the range must be limited, otherwise this person may manipulate the system beyond the desired range, either too cold or too warm.

It is desirable to control the temperature of the evaporator, as for example, lower the temperature thereof below normal for quickly freezing water or increase the temperature above normal for defrosting the evaporator. It is desirable therefore, to provide a limited range controller for the refrigerating system so that the unskilled housewife can regulate, within predetermined limits, the system whereby it functions at a lower than normal temperature for quick freezing or higher than normal for defrosting the evaporator of the ice that has accumulated thereon. A further desirable control is to stop and prevent the restarting of the compressor.

One of the objects of the present invention is to provide a controller of such a type that the readily accessible adjusting device is limited in its movement and in which a variable pitch cam is employed for regulating the tension of the adjustment spring. Another object of the present invention is to so construct and arrange the cam so that, at one position thereof, it will render the system inoperative.

Another object of the present invention is to utilize the adjusting spring of the controller for quickly actuating the stopping mechanism of the system. In this connection the fall in the adjusting cam which, when it is moved to engagement with the cam follower, is rotated quickly by the spring and this quick movement is utilized to quickly operate the contacts of the circuit to the motor.

A still further object of the present invention is to construct the adjusting cam so that it is provided with a movement restraining rise closely in advance of the fall of the cam so that, when the housewife attempts to stop the refrigerating operation, the turning movement of the cam is restrained and this restraining such that, when the restraining movement is overcome, sufficient force will be exerted by the housewife to snap the mechanism from its operative to its inoperative position.

Still further objects are: to provide users and factory adjustments for the controller in which parts are common to both; to provide levers of sheet metal fabricated so as to form knife edges and knife edge bearings.

Another object of the present invention is to provide a housing for the controller in which some of the walls are formed of resilient material and in which this resiliency is utilized for holding a removable side wall in position.

A further object of the invention is to construct and arrange the controller so that the removable side plates prevent the displacement of a fulcrum pin of the controller.

A still further object of the invention is to provide a terminal block which carries the connections for connecting the same in an electrical circuit and which also carries the stationary contacts of the snap switch. In carrying out this object it is a further object of the invention to provide for removably carrying the terminal block on the switch proper.

Other and further objects and advantages will be apparent from the following description, reference being had to the accompanying drawings wherein a preferred form of embodiment of the present invention is clearly shown.

Figures 1, 2, 4:
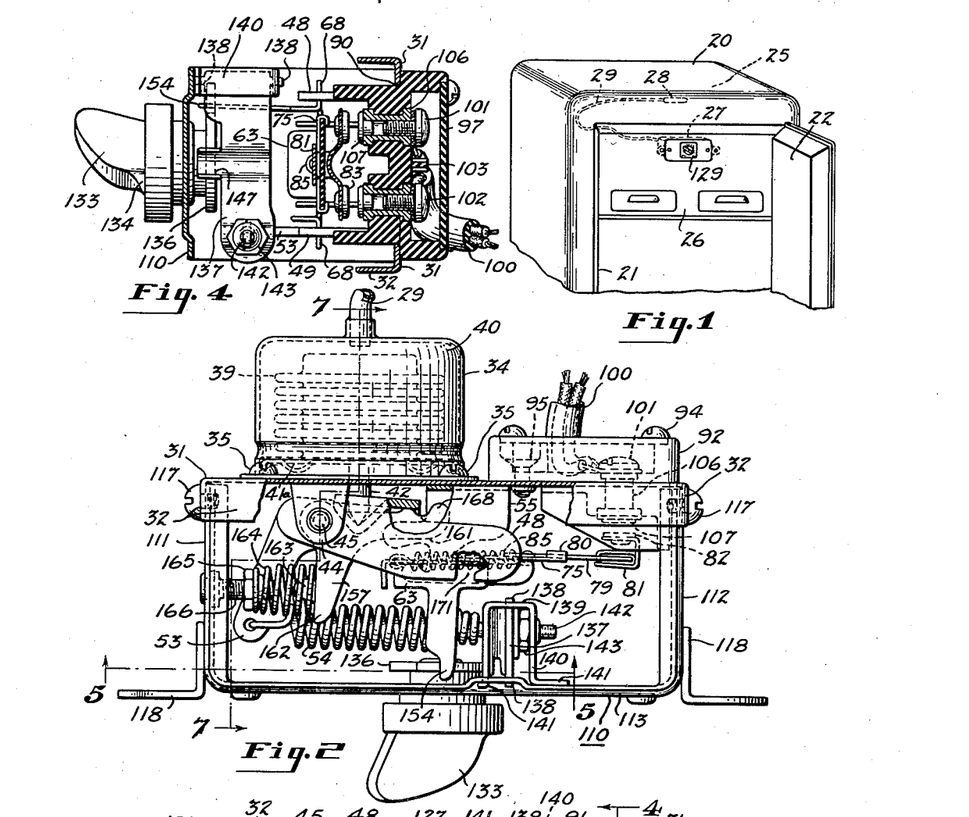
Fig. 1 is a perspective view of a refrigerator showing the door opened and the control mechanism positioned therein.
Fig. 2 is a side view of the improved controller, the side plate being removed and certain parts being shown in section.
Fig. 4 is a sectional view taken on line 4—4 of Fig. 3.
Figure 3:
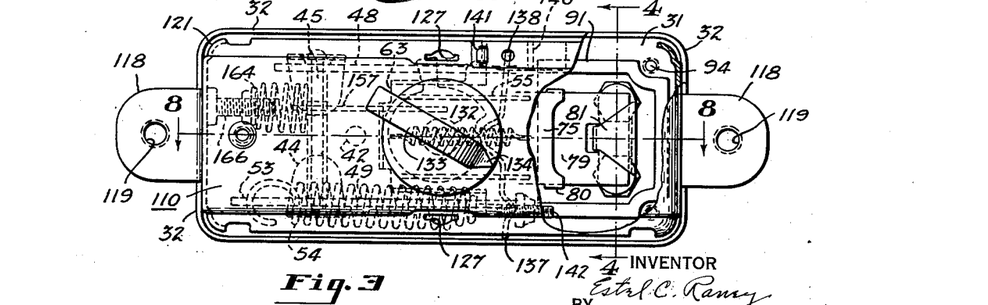
Fig. 3 is a front view of the controller with the dial plate removed and parts being shown in section.

For the purpose of illustrating one form of the invention, the controller is herein shown as an automatic switch for completing and interrupting the circuit of an electric motor which drives the compressor of a refrigerating apparatus. In Fig. 1 of the drawings I have shown a refrigerator cabinet 20 having a door opening 21 closed by door 22. An evaporator is located within the compartment 25 of the cabinet and is disposed in back of an evaporator cover 26. The refrigerator control in the form of an automatic switch 27 is carried by the cover 26 and this controller 27 is connected to a bulb 28 by a tube 29. This bulb 28 may be connected either in intimate metallic contact with the evaporator or it may be disposed within the compartment containing the food.

The controller 27 includes a base 31 preferably formed of sheet metal and having an outwardly turned flange 32 completely surrounding the same. A bellows housing 34 is attached to the back side of the base 31 by screws 35. The housing 34 is in the form of a cup and the front thereof is closed by a wall 36 having a central opening 37. Preferably the wall 36 is soldered or welded to the inside wall of cup 34. A yieldable wall 39 in the form of a flexible metallic bellows is disposed within the housing 34—36, one end 40 thereof being closed and the other end 41a being sealed to the wall 36. Thus the space between the housing 34 and the bellows 39 provides a sealed chamber 41. The back side of the housing 34 is connected with the tube 29. In this manner expansion and contraction of a volatile fluid within the bulb 28 will cause respectively the compression and expansion of the bellows 39. A pin 42 is suitably secured to the inside of wall 40 of bellows 39 and extends through the opening 37 in wall 36 and through an opening 43 in base 31.

Forwardly extending ears 44 are punched out of the base 31 and these ears support a fulcrum pin 45 on which a lever 47 is pivotally mounted. This lever 47 is generally channel-shaped to form an upper arm 48 and a lower arm 49 connected by a yoke portion 50. The yoke 50 is pressed inwardly as at 51 providing a socket for receiving the point of pin 42. A forwardly extending lever arm 53 is formed integrally with the arm 49 of sheet metal lever 47 and the forward end thereof is connected with a spring 54 normally biased to rotate the lever 47 to tend to move the pin 42 rearwardly. A generally U-shaped stop 55 has its yoke portion 56 suitably secured to the front side of the base 31 and the legs of stop 55 are both interposed between the lever arms 48 and 49. The lower leg 58 of stop 55 is provided with an ear 59 which lies in the path of movement of a hump 61 formed on the forward side of yoke 50 of lever 47 for the purpose of limiting the forward movement of lever 47. The rearward movement of the lever 47 is limited by the lever yoke 50 engaging the base 31.

A sheet metal lever 63 of a general U-shape includes an upper arm 64, a lower arm 65 and a connecting yoke 66. The arms 64 and 65 are interposed respectively between the arm 49 and the leg 58 of stop 55 and arm 48 and leg 67 of stop 55. Each arm 64 and 65 is provided with an outwardly extending ear 68 each forming a knife edge and each being journaled on a knife edge bearing 70 of arms 48 and 49 of lever 47. The rearward movement of lever 63 is limited by the lever engaging the ear 59 of stop 55 and the forward movement of the lever 63 is limited by the engagement of the yoke 66 with ears 71 on the legs 58 and 67 of stop 55. As viewed in Fig. 8, the right-hand edges of legs 58 and 67 are cut inwardly as at 72 and form knife edge bearings 73. A bifurcated lever 75 is provided with knife edges 76 at the end of the forks which are journaled in the knife edge bearings 73. Ears 77 on the forks extend beyond the knife edges and are arranged to engage the inside edges of legs of stops 58 and 57 so as to limit the lateral movement of the lever 75. Lever 75 is formed of sheet metal material and an insulating strip 79 is crimped as at 80 to the lever 75. The extreme right-hand edge of the insulating strip 79 carries a clip 81 which in turn forms a conductor for bridging contacts 82 and 83. A spring 85 has one end thereof hooked to the yoke 66 and the other end thereof connected at the end of the forks to the lever 75. Thus it is apparent that the spring 85, being connected between the lever 63 and lever 75, tends to pull the levers toward one another and therefore yieldingly holds the knife edges of the respective levers in their respective knife edge bearings.

Figures 8, 10, 15:
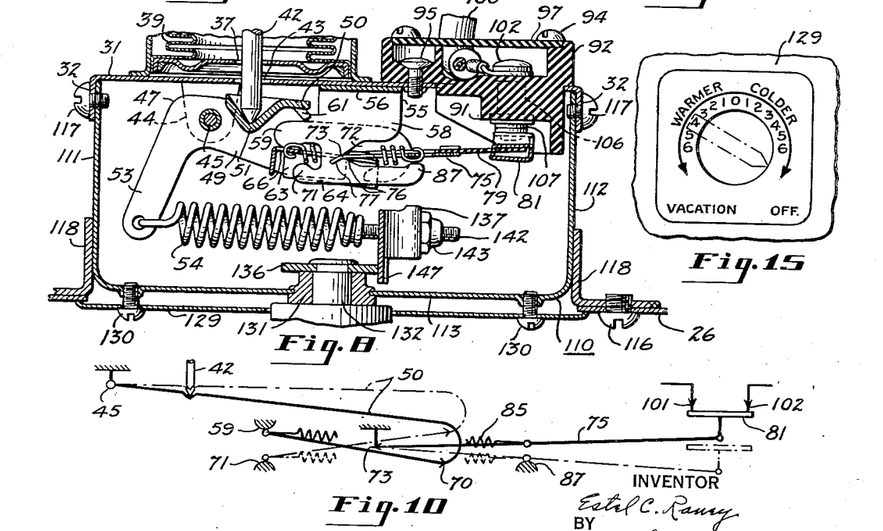
Fig. 8 is a sectional view taken on line 8—8 of Fig. 3.
Fig. 10 is a diagrammatic view showing the lever arrangement of the snap acting switch.
Fig. 15 is a fragmentary front view of the dial plate showing the user's adjusting knob.
Figure 11:
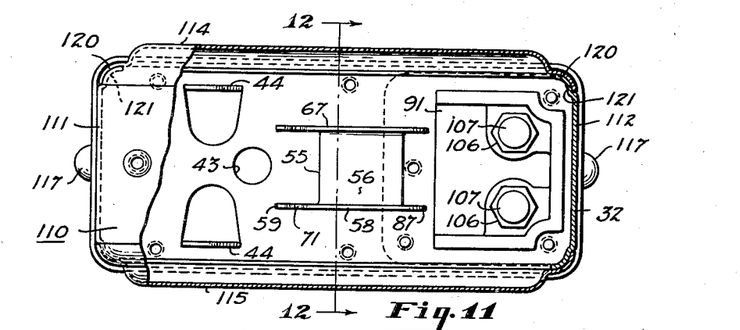
Fig. 11 is a top plan view of the controller base showing the housing in section.
Figure 12:
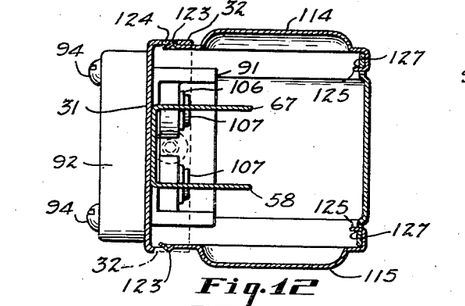
Fig. 12 is a sectional view taken on line 12—12 of Fig. 11.

Let us assume that the mechanism is in the position shown in Fig. 8 or as diagrammatically shown in Fig. 10, then upon contraction of the fluid in bulb 28, there will be a decrease in pressure in the chamber 41 of the bellows housing 34 and the pressure on the front side of the bellows will cause the same to expand. When the knife edge bearings 70 of lever 47 move rearwardly beyond the dead center position with respect to lever 63, the lever 63 will be snapped forwardly due to the tension of the spring 85 acting thereon, and, directly after this occurs, the yoke 66 of lever 63 will be moved beyond the dead center position with respect to the knife edge bearings 73 and lever 75 and thereby quickly snapping lever 75 forwardly to move contacts 82 and 83 forwardly. The forward movement of lever 75 is limited by ears 87 formed on the legs 55 and 67 of stop 55. This forward movement of the bridging contacts 82 and 83 will interrupt the motor circuit as will be more clearly described hereinafter. When the temperature of the evaporator or the food compartment increases to a predetermined high value the volatile fluid in bulb 28 will expand causing a collapsing of the bellows and the levers will be snapped in the opposite direction to again cause contacts 82 and 83 to complete the motor circuit. This intermittent operation continues to maintain the evaporator or the food compartment at the desired temperature.

Figure 13:
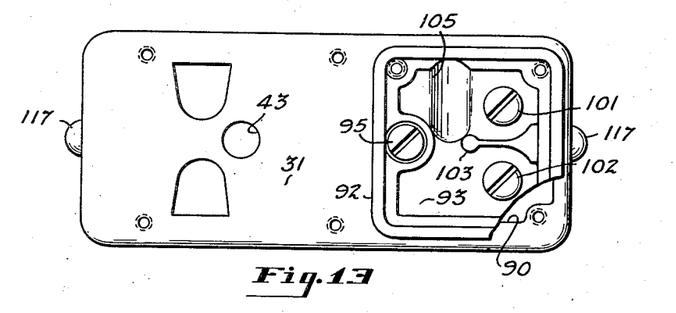
Fig. 13 is a bottom view of the controller base.
Figure 14:
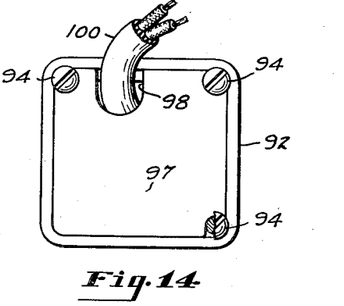
Fig. 14 is a rear view of the terminal block for the controller.
Figure 16:
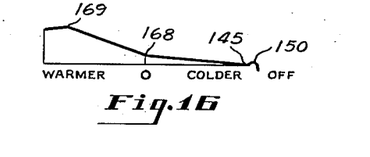
Fig. 16 is a diagram of the cam action.

An opening 90 is provided in the right-hand side of the base 31 for receiving an insulating block 91. This block is provided with an enlarged portion 92 on the rear side of the base 31 which is hollowed out to form a terminal box 93. Three screws 94 extend through three corners of the enlarged portion 92 and are threaded into the base 31 for holding the block in position. A fourth screw 95 extended through a counter-sunk portion of enlarged portion 92 is also threaded into the base 31. A cover 97 is provided for the box 93 and the corners thereof are notched for receiving the shank of the screws 94. When the cover is in position and the screws tightened, the heads of the screws 94 overlie the notches to hold the cover 97 in position. It will be seen in Figs. 8 and 13 that the portion 92 is recessed sufficiently for receiving the cover 97. It will be noted from Fig. 14 that the cover 97 is provided with a slot 98 for receiving the cable 100. The wires from the cable are connected by screws 101 and 102 to terminal bushings or connectors 106, there being a raised portion 103 formed integrally with the block 91 so as to prevent the bare wires from engaging one another. The box 93 is also slightly recessed at 105 for receiving the cable 100.

The screws 101 and 102 are threaded into terminal bushings 106 imbedded in the insulation and these terminal bushings 106 extend through the main portion of the insulating block 91 and are provided at the forward end with contacts 107 arranged to be bridged by contact 82, clip 81, and contact 83. The rearward movement of lever 75 is limited by the engagement of contacts 81 and 82 with contacts 107.

It is apparent from the foregoing that by merely loosening screws 94 the cover 97 can be removed whereby access may be had to the interior of box 93 for connecting and disconnecting the cable from screws 101 and 102. The entire terminal block can be removed as a unit without disturbing the adjustment of the switch by merely removing screws 94 and 95.

The cover for the switch mechanism comprises a generally U-shaped sheet metal member 110 having opposed legs 111 and 112 connected by a front yoke 113. The housing also includes side plates 114 and 115. The legs 111 and 112 extend inside the flange 32 of base 31 and are secured by screws 117 which extend through the flange 32 and are threaded into the legs 111 and 112. Brackets 118 are suitably secured to the front end of legs 111 and 112 and these brackets are provided with threaded openings 119 receiving screw 116 for securing the same to the evaporator cover 26. The side plates 114 and 115 are also formed of sheet metal and are bent as at 120 so as to overlie the bent-in portions 121 of legs 111 and 112. The flange 32 and the side plates 114 and 115 form frictional detents for holding the side plates in position. In the specific embodiment bulges 123 are formed on the rear ends of the side plates 114 and 115 which are received by openings 124 in the flange 32. The side plates being of resilient material permit the depression of the side plates sufficiently so that the bulge portion 123 can slide over the edge of the flange and snap into the opening 124. The upper end of the side plates are prevented from movement upwardly or downwardly, as the case may be, by an ear 125 formed on each side plate. These ears 125 extend towards the base and are arranged parallel with the side walls of the side plates and extend into openings 127 in the edges of the yoke 113 of U-shaped member 110.

A dial plate 129, having desirable indicia thereon, is secured to the yoke 113 of member 110 by screws 130. A bushing 131 is suitably and non-rotatably secured in the yoke 113, which bushing forms a bearing for a shaft 132. The forward end of the shaft 132 carries a knob 133 having an index pointer 134. The indicia on the dial plate is arranged in the arc of movement of the pointer 134. A cam 136 is secured to the shaft 132 as by swaging over the shaft 132. This cam cooperates with a cam follower 137 in the form of a lever, the lever being provided with two integrally formed bearings 138 one of which is journalled in an opening formed in the yoke 113 and the other is journaled in the yoke 139 of a U-shaped member 140. This U-shaped member 140 is held in place by having a turned out ear 141 engaging the back side of yoke 113. In assembling, the ear 141 is inserted through an opening in the yoke 113 and then the member is moved to the left. Next, the other end 141 of member 140 is spot welded to the yoke 113. The lower end of lever 137 is provided with a rectangular opening for receiving a mutilated screw 142. The head end of this screw is connected with one end of the spring 54. A nut 143 is threaded on screw 142 and bears against the lever 137 and can be turned on the screw for varying the tension of the spring, the rectangular opening in the lever 137 cooperating with the mutilated screw for preventing the rotation of the screw when the nut is turned.

Figure 5:
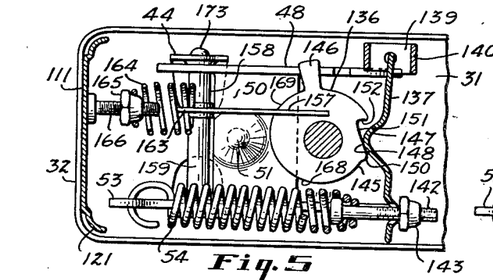
Fig. 5 is a fragmentary sectional view taken on line 5—5 of Fig. 2.
Figure 6:
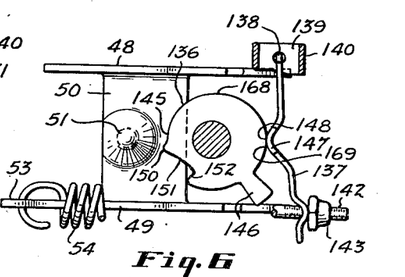
Fig. 6 is a fragmentary sectional view similar to Fig. 5 but showing a cam and cooperating elements in another position.
Figures 7, 9:
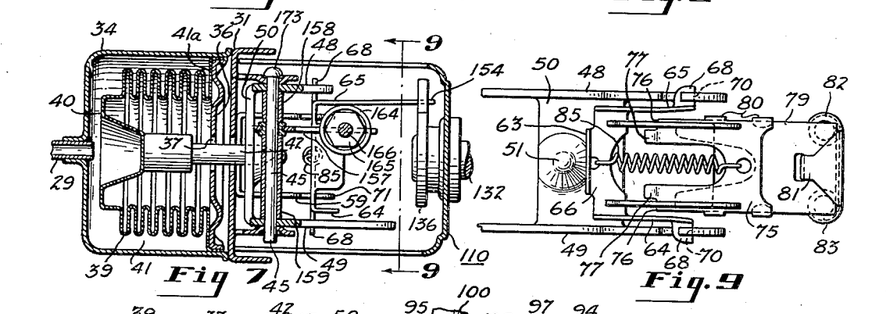
Fig. 7 is a sectional view taken on line 7—7 of Fig. 2.
Fig. 9 is a front view in elevation of the snap acting mechanism of the controller.

It will be noted that the spring 54 holds the cam follower 137 in contact with the cam 136. Referring to Figs. 5 and 6, it will be noted that the cam is arranged to vary the tension of spring 54. When the cam 136 is moved by the knob 133 to the position shown in Fig. 6, the cam follower 137 will have moved the right-hand end of the spring to substantially its extreme right-hand position in which the spring will be stretched the most. When the cam is rotated clockwise, as viewed in Fig. 6, the tension of the spring is decreased until it reaches the point 145 where the spring will be under the least tension during the operation of the system. Thus it will be seen that the tension of the spring can be varied by the turning of the knob, and the construction and arrangement of the parts is such that the refrigerator can operate at a relatively low temperature for quickly freezing water or desserts, or can be operated at a temperature in which the exterior walls of the evaporator are decreased to below freezing point of water while the refrigerator is on its operating phase of the cycle of operation of the system and in which the outside walls of the evaporator are above the freezing temperature of water during the inoperative phase so that defrosting can take place cyclically, or the tension may be such that the outside walls of the evaporator are maintained above freezing temperatures continuously during the entire cycle of operation of the refrigerator. In the illustration, Fig. 6, in which the spring is stretched to its extreme, it exerts sufficient pressure in opposition to the bellows 39 so that the evaporator is maintained at the warmest temperature to which the housewife may adjust the same. When the cam follower arrives at the point 145 on the cam, the evaporator will be maintained at its coldest temperature. The extent to which counter-clockwise movement can be imparted to the knob is limited by the engagement of a projection 146 of the cam 136 against a projection 147 on the cam follower 137. This projection 147 is disposed forwardly and in alignment with the nose 148 of the cam follower 137.

The knob 133 acting through the cam 136 is also utilized for positively interrupting the circuit to the motor by positively separating contacts 82 and 83 from contacts 107. Referring again to Fig. 6, it will be noted that the cam 136 is provided with a rise 150 in the form of a hump in the cam and from the peak of this rise there is a decided fall 151 which terminates in a shoulder 152. When the cam 136 is moved to the position shown in Fig. 5, that is, beyond the rise 150, the projection 146 will engage a forwardly extending finger 154 formed integrally with the top arm 65 of a lever 63. Projection 146 engaging finger 154 will cause the same to be moved to the right, as viewed in Fig. 2. When this occurs the left-hand end of lever 63 will be swung forwardly about the knife-edge bearings 70 beyond the dead center position of said lever 63 and lever 75 so that the spring 85 will pull lever 75 forwardly to quickly separate contacts 82 and 83 from contacts 107. In this manner the refrigerating machine may be shut off at will. Of course when the knob 133 and cam 136 are rotated in a counter-clockwise direction the projection 146 will be moved away from the finger 154 and, if at that time there is a demand for refrigeration, the bellows and levers 47 and 63 will be in a position so that the lever 75 will be snapped to close contacts 82 and 83 on contacts 107.

The purpose of the rise or hump 150 in the cam 136 is to insure a positive right-hand movement of the finger 154. The hump restrains the movement of the cam and the attendant must exert sufficient pressure on the knob so that when the tension of the spring 54 is overcome, sufficient inertia will be exerted to cause the projection 146 to strike the finger 154 and carry same to its extreme right-hand position. Also this is assisted by the sharp fall 151 in the cam 136 which when it arrives upon the cam follower, the tension of spring 54 will tend to rotate the cam in a clockwise direction. The shoulder 152 on the cam 136 limits the extent of clockwise movement of the cam.

By limiting the clockwise movement of the cam 136 as just described and by limiting the counter-clockwise movement of the cam by engagement of projection 146 with projection 147, there is provided a limited adjustment of the controller and the range of this limited adjustment is sufficient for the attendant to adjust a refrigerator for the desired preservation of food, defrosting, and quick freezing.

The nut 143 is adjusted and set at the factory and preferably this adjustment is made so that the switch opens at a predetermined fixed temperature. The differential between the opening and closing pressures of the switch can also be varied by mechanism now to be described. A bell-crank lever 157 is journaled on the shaft or pin 45. Bushings 158 and 159 on the shaft 45 prevent lateral movement of the lever 157. One arm 161 of this lever extends to the right and is arranged to be engaged by the yoke 50 of lever 47 when the bellows is being compressed. The other and forwardly extending arm 162 of this lever is provided with a nose 163 which extends into the open end of a coil spring 164. The opposite end of this coil spring 164 abuts a nut 165 carried by a stationary screw 166. The nut 165 can be adjusted on the screw 166 to govern the tension of spring 164. Now as the pressure increases in chamber 41 of the bellows housing, the pin 42 will move the lever 47, against the action of the spring 54, and before the lever 47 is moved to snap the switch closed, the yoke 50 of lever 47 will engage the arm 161 of the lever 157 and the spring 164 will then resist the closing movement of the switch. When the pressure within the housing 34 is decreasing and the yoke 50 of lever 47 is moving rearwardly permitting a counter-clockwise movement of lever 157, a nose 168 on the extreme right-hand end of arm 161 of lever 157 will engage the yoke 56 of stop 55 before the lever 47 is moved to a position in which the contacts are snapped open. Thus it is apparent that spring 164 is rendered ineffective just prior to the opening of the contacts and the opening movement of the contacts is under the control of the spring 54 only. In this manner the differential between the opening and the closing of the switch can be controlled, the opening being controlled entirely by the adjustment of nut 143 for spring 54 and the closing of the contacts can be controlled by the adjustment of spring 164.

It will be understood, of course, that the lever 157 and the cooperating spring 164, nut 165, and screw 166 can be omitted if an adjustable differential, between the opening and closing pressure of the switch, is not necessary.

From the foregoing it will be seen that I have provided a compact controller for a refrigerating system by which desired temperatures can be maintained and in which the extent to which the housewife may adjust the same is limited to the necessary range. I have also provided for the starting and stopping of the refrigerating mechanism manually and this operation together with the adjustment is accomplished through a single knob. Positive starting and stopping through the manual control has been insured. The entire range of adjustment and the starting and stopping have all been accomplished through one cam, the cam being provided with a projection 147 to limit the range of movement in one direction, with a shoulder 152 to limit the movement in the opposite direction, and, the cam is arranged to increase and decrease the spring tension for obtaining the desired refrigerating conditions.

As previously stated, the user's adjustment must be limited, otherwise the user will destroy the normal setting. The user's adjustment must be confined within one revolution of the knob, otherwise superimposed indicia would be necessary.

For this reason, the periphery of cam 136 forms a variable pitch camming surface. The angular fall from the point 168 to the point 145 of the camming surface is less than the angular rise between the points 168 and point 169. Thus it will be apparent that the increments of temperature variation through the arc of movement between point 145 and point 168 are less than the variation through the arc of movement between point 168 and point 169, per like movements of the cam. This is desirable because it is necessary, for the purpose of symmetry of the markings on the dial and more particularly for the purpose of obtaining sensitive range adjustment for decreasing the temperatures and relatively wider range regulations for increasing the temperatures, all within, at the most, one revolution of the knob 133. The highest point of the cam is at 169 and there is a fall from 169 toward projection 146. When nose 148 rides on the surface between 169 and projection 146, the cam is at the desired defrosting or "vacation" position. The purpose of the incline from projection 146 to point 169 is to insure retention of the cam in its "vacation" position.

The controller is in normal position when the follower nose 148 rides at the point 168 of cam 136. Since the use from that point toward the point 169 is relatively great, the increment of temperature change is relatively great whereby a substantial increase in temperature, desirable for defrosting, is obtainable, and, since the fall of the cam from the point 168 to point 145 is relatively small, the decrement of temperature change is relatively small and therefore relatively sensitive adjustments may be had. It is apparent therefore that by the use of a cam having variable pitch camming surface, I have provided within, even less than, one turn of the knob, a customer's adjustment having sensitive cold adjustments for quick freezing, and having relatively wider range adjustments for warmer than normal and defrosting temperatures.

This cam surface is also provided with a hump 150 and a decided fall 151 for insuring the positive movement of the switch towards opening position, the hump 150 also acting as a restraining rise to the movement of the knob so as to indicate to the attendant an extreme automatic operating position of the controller, that is, when the attendant moves the knob clockwise, the rise 150 engaging the cam follower nose 148 will restrain the further clockwise movement of the knob warning the attendant that the switch has been moved to one of its extreme adjustable positions.

It will be further noted that the major portions of this controller are fabricated from stamped sheet metal and can be made at a relatively low cost. The cam 136 is formed from a stamping of sheet metal. The levers 47, 63, and 75 and stop 55 are made of sheet metal and include integrally formed knife edges and knife edge bearings. For example, lever 63 including the ears 68 are formed from a stamping of sheet metal. The ears 68 are bent so that the flat sides thereof lie at right angles to the flat sides of arms 64 and 65. The edges of the ears 68 are milled to form the knife edges. It will be noted that the lever arms 48 and 49 of lever 47 are slotted as at 171 to form pockets for receiving the ears 68. The mouth of these slots are narrower than the width of the ears 68 so that the ears must be inserted edgewise, i. e., the knife edge is inserted first. When the levers 47 and 63 are in position, the ears 59 and 71 of stop 55 confine the movement of lever 63 to such extent that the ears can not be jarred out of the pockets 171, i. e., the right-hand edge of the ears 68 will engage the right edge of pocket 171 and in this manner the knife edge can not clear the mouth of the pocket.

Access may be had to the mechanism within the switch housing by merely removing one or both of the side plates 114 and 115 and to accomplish this it is necessary only to press inwardly on the side plate to be removed to release the bulge 123 from the opening 124 and then by pulling forwardly, the side plate can be removed. If it is desirable to reset the factory setting, it is necessary only to remove a side plate and then the service man can readjust screw 143. It will be noted that it will not be necessary to readjust the knob 133 with respect to cam 136 if the screw 143 is reset. This is made possible because by the readjustment of nut 143, the tension of spring 54 is also varied on the lever or cam follower 137. I have accomplished this by arranging the parts so that the adjusting nut engages the cam follower at all times.

The side plates 114 and 115 can be used to prevent dislodging of the fulcrum pin 45. This pin is made sufficiently long so that it will engage a side plate and therefore its lateral movement will be arrested before it can be withdrawn from its fulcrum. Manifestly, no other means need be employed for preventing dislodgement of the pin 45. A head 173 can be formed on the pin 45 if it is desirable. When the upper side plate is removed, the pin 45 can be withdrawn to dismantle the switch mechanism.

The current conductors can also be readily removed. If it is desirable to replace contacts 107 this can be accomplished by merely removing the screws 94 and 95 and an entirely new insulated contact block 91 can be substituted. The clip 81 carrying the contacts 82 and 83 is formed of sheet copper which is sufficiently pliable so that it can be bent and removed and another substituted if it is desirable to remove the assembly including contacts 82 and 83 and clip 81.

While the form of embodiment of the present invention as herein disclosed constitutes a preferred form, it is to be understood that other forms might be adopted, all coming within the scope of the claims which follow.

I claim:

1. In a thermally responsive controller, relatively stationary and movable elements, snap acting mechanism for the movable element, means for actuating said snap acting mechanism, a cam, a cam follower associated with the cam, a finger connected with said snap acting mechanism, said cam having a shoulder arranged to engage said finger for causing the separation of said elements, a spring associated with the actuating means and connected with the cam follower for modifying the operation of the actuating means by movement of the cam.

2. In a thermally responsive controller, relatively stationary and movable elements, snap acting mechanism for the movable element, means for actuating said snap acting mechanism, a cam, a cam follower associated with the cam, a finger, connected with said snap acting mechanism, said cam having a shoulder arranged to engage said finger for causing the separation of said elements, a spring associated with the actuating means and connected with the cam follower for modifying the operation of the actuating means by movement of the cam, said cam having a fall engageable with the follower and said spring exerting pressure on the cam follower to rotate the cam when the cam follower engages said fall, said shoulder being located so as to engage the finger during the movement of the cam by the spring.

3. In a thermally responsive controller, relatively stationary and movable elements, snap acting mechanism for the movable element, means for actuating said snap acting mechanism, a cam, a cam follower associated with the cam, a finger connected with said snap acting mechanism, said cam having a shoulder arranged to engage said finger for causing the separation of said elements, a spring associated with the actuating means and connected with the cam follower for modifying the operation of the actuating means by movement of the cam, said cam having a fall engageable with the follower and said spring exerting pressure on the cam follower to rotate the cam when the cam follower engages said fall, said shoulder being located so as to engage the finger during the movement of the cam by the spring, means for rotating said cam so as to advance the fall toward said cam follower, said cam having a movement restraining rise disposed closely in advance of said fall and engageable with the cam follower.

4. In a thermally responsive controller, relatively stationary and movable elements, snap acting mechanism for the movable element, means for actuating said snap acting mechanism, a cam, a cam follower associated with the cam, a finger connected with said snap acting mechanism, said cam having a shoulder arranged to engage said finger for causing the separation of said elements, a spring associated with the actuating means and connected with the cam follower for modifying the operation of the actuating means by movement of the cam, means for moving the cam to advance the shoulder toward said finger, said cam having a movement restraining rise disposed closely in advance of said shoulder and engageable with the cam follower.

5. In a thermally responsive controller, a snap acting mechanism including a plurality of levers, means for moving one of said levers, a spring connecting said levers and arranged to snap the other lever, relatively stationary and movable controller elements, the movable element being connected with the second mentioned lever, and actuated thereby, a cam, a cam follower associated with the cam, a finger connected with the first mentioned lever and adapted to move the same, said cam having a shoulder arranged to engage said finger for separating said elements, a spring associated with the actuating means and connected with the cam follower for modifying the operation of the actuating means by movement of the cam.

6. In a thermally responsive controller, a snap acting mechanism including a plurality of levers, means for moving one of said levers, a spring connecting said levers and arranged to snap the other lever, relatively stationary and movable controller elements, the movable element being connected with the second mentioned lever, and actuated thereby, a cam, a cam follower associated with the cam, a finger connected with the first mentioned lever and adapted to move the same, said cam having a shoulder arranged to engage said finger for separating said elements, a spring associated with the actuating means and connected with the cam follower for modifying the operation of the actuating means by movement of the cam, said cam having a fall engageable with the follower and said spring exerting pressure on the cam follower to rotate the cam when the cam follower engages said fall, said shoulder being located so as to engage the finger during the movement of the cam by the spring.

7. In a thermally responsive controller, a snap acting mechanism including a plurality of levers, means for moving one of said levers, a spring connecting said levers and arranged to snap the other lever, relatively stationary and movable controller elements, the movable element being connected with the second mentioned lever, and actuated thereby, a cam, a cam follower associated with the cam, a finger connected with the first mentioned lever and adapted to move the same, said cam having a shoulder arranged to engage said finger for separating said elements, a spring associated with the actuating means and connected with the cam follower for modifying the operation of the actuating means by movement of the cam, said cam having a fall engageable with the follower and said spring exerting pressure on the cam follower to rotate the cam when the cam follower engages said fall, said shoulder being located so as to engage the finger during the movement of the cam by the spring, means for rotating said cam so as to advance the fall toward said cam follower, said cam having a movement restraining rise disposed closely in advance of said fall and engageable with the cam follower.

8. In a thermally responsive controller, a snap acting mechanism including a plurality of levers, means for moving one of said levers, a spring connecting said levers and arranged to snap the other lever, relatively stationary and movable controller elements, the movable element being connected with the second mentioned lever, and actuated thereby, a cam, a cam follower associated with the cam, a finger connected with the first mentioned lever and adapted to move the same, said cam having a shoulder arranged to engage said finger for separating said elements, a spring associated with the actuating means and connected with the cam follower for modifying the operation of the actuating means by movement of the cam, means for moving the cam to advance the shoulder toward said finger, said cam having a movement restraining rise disposed closely in advance of said shoulder and engageable with the cam follower.

9. In a thermally responsive controller, a plate, an element to be controlled carried by the plate, snap acting mechanism for actuating the element carried by the plate, a U-shaped member having a yoke wall and legs extending therefrom, the ends of the legs being connected with the plate and cooperating therewith to form four walls of a housing for the snap acting mechanism, adjusting mechanism carried by the yoke wall of the U-shaped member, a tension spring interposed between the adjusting mechanism and the snap acting mechanism within the housing, and removable side plates providing the other two walls of the housing.

10. In a thermally responsive controller, a plate forming a wall of the housing and supporting switch mechanism on one side thereof, a U-shaped member forming therewith four walls of the housing and having the leg ends thereof attached to the plate, a side plate having the edges thereof overlying the edges of adjacent legs of the U-shaped member, one of said plates being formed of resilient material for frictionally holding the side plate in position at the junction of the side plate and the first mentioned plate, and an interfitting connection between the U-shaped member and the other end of the plate for preventing sidewise movement of the plate.

11. In a thermally responsive controller, a plate forming a wall of the housing and supporting switch mechanism on one side thereof, a U-shaped member forming therewith four walls of the housing and having the leg ends thereof attached to the plate, a side plate having the edges thereof overlying the edges of adjacent legs of the U-shaped member, one of said plates being formed of resilient material for frictionally holding the side plate in position at the junction of the side plate and the first mentioned plate, the yoke wall of the U-shaped member having an opening adjacent the edge thereof, the end of the side plate opposite the first mentioned plate having an ear extending toward the first mentioned plate and extendable into said opening for preventing sidewise movement of the plate.

12. In a thermally responsive controller, switch mechanism, a housing for the switch mechanism including a base for supporting the switched mechanism, said base having an outturned flange, a U-shaped member having the ends of the legs thereof connected with the base to form four walls of the housing, a side plate having opposite edges overlying one edge of each of the legs of the U-shaped member and having another edge interposed between the flange and said edges of the legs, said side plate being formed of resilient material for frictional engagement with the flange and said edges of the legs, and an interfitting connection between the U-shaped member and the end of the side plate opposite the flange for preventing sidewise movement of the plate.

13. In a thermally responsive controller, switch mechanism, a housing for the switch mechanism including a base for supporting the switched mechanism, said base having an outturned flange, a U-shaped member having the ends of the legs thereof connected with the base to form four walls of the housing, a side plate having opposite edges overlying one edge of each of the legs of the U-shaped member and having another edge interposed between the flange and said edges of the legs, said side plate being formed of resilient material for frictional engagement with the flange and said edges of the legs, said resilient side plate and flange being fabricated to form a frictional detent, and an interfitting connection between the U-shaped member and the end of the side plate opposite the flange for preventing sidewise movement of the plate.

14. In a thermally responsive controller, a switch base, having a back side and a front side and having an opening therein, a movable contact, switch operating mechanism carried by the base at the front side thereof for actuating the movable contact, a terminal block of insulating material having a portion thereof extending from said back side through said opening, a plurality of contacts carried by the block and adapted to be bridged by the movable contact, connectors carried by the block for connecting the said plurality of contacts with an electrical circuit, and means for carrying the terminal block on the switch base for removal through said opening.

15. In a thermally responsive controller, a switch base, having a back side and a front side and having an opening therein, a movable contact, switch operating mechanism carried by the base at the front side thereof for actuating the movable contact, a terminal block of insulating material having a portion thereof extending from said back side through said opening, a plurality of connectors extending through the terminal block and having means on one side thereof for connecting the same in an electrical circuit, contacts on the extended ends of the connectors and adapted to be bridged by the movable contact, and means for carrying the terminal block on the switch base for removal through said opening.

16. In a thermally responsive controller, a switch base having an opening therein, a movable contact on one side of the base, switch operating mechanism carried on the same side of the base, a terminal block of insulating material having an enlarged portion overlying the opening at the opposite side of the base and having a portion extending into the base, a plurality of connectors extending through the terminal block and having means on said opposite side for connecting the same in an electrical circuit, contacts connected with the other ends of the connectors and adapted to be engaged by the movable contact, and means for removably carrying the terminal block on the switch base.

17. In a thermally responsive controller, a switch base having an opening therein, a movable contact, switch operating mechanism carried by the base for actuating the movable contact, a terminal block including insulating material extending through said opening, a connector extending through the insulating material and having means on one end thereof for connecting the same with an electrical circuit, a contact on the other end of said connector adapted to be engaged by the movable contact, and means for carrying the terminal block on the switch base for removal through said opening.

18. In a thermally responsive controller, relatively stationary and movable elements, pressure operated means for actuating the movable elements, said movable elements including a pivoted bellcrank lever engaged with said pressure operated means and having an arm extending therefrom, a tension spring connected with said arm for affecting the movement of the pressure operated means, a cam follower connected with said spring for varying the tension, and a cam, said cam having its camming surface on the peripheral edge thereof and said follower directly cooperating with said edge.

19. In a thermally responsive controller, relatively stationary and movable elements, pressure operated means for actuating the movable elements, said movable elements including a pivoted lever engaged with said means and having a lever extending laterally thereof, a spring connected with said arm for affecting the movement of the pressure operated means, means for varying the tension of the spring, an adjustable connection between the varying means and the spring, other means for varying the tension of the spring including an element for moving the first spring tension varying means and a knob for moving the last named element, and means on said last named element cooperating with said other means for limiting the movement thereof between fixed limits.

20. In a thermally responsive controller, relatively stationary and movable elements, pressure operated means for actuating the movable elements, a spring for affecting the movement of the pressure operated means, one end of said spring having a narrowed axial opening, a screw having a head larger than said opening, said head being disposed within the convolutions of the spring and having the threaded shank end extending axially therefrom, said threaded shank being mutilated, an adjustable nut on said shank, a movable member disposed between the nut and said spring, said movable member having an opening for loosely receiving said shank and cooperating with the shank for preventing rotation of the shank, a knob for moving the movable member, and means for limiting the movement of the knob between fixed limits.

21. In a thermally responsive controller, a snap acting switch mechanism including, a lever having a pair of lever arms having slots therein each providing a knife edge bearing, a lever of sheet metal having a pair of integrally formed and parallelly disposed lever arms, ears formed integrally with the arms of the sheet metal lever and bent so that the flat sides thereof lie at an angle to the flat sides of the sheet metal lever arms, said ears forming knife edges seated in the knife edge bearings.

22. In a thermally responsive controller, a snap acting switch mechanism including, a lever having a pair of lever arms having slots therein each providing a knife edge bearing, a lever of sheet metal having a pair of integrally formed and parallelly disposed lever arms, ears formed integrally with the arms of the sheet metal lever and bent so that the flat sides thereof lie at an angle to the flat sides of the sheet metal lever arms, said ears forming knife edges seated in the knife edge bearings, the arms of one of said levers telescoping with the arms of the other lever and said ears projecting far enough through said slots to prevent lateral displacement of the levers.

23. In a thermally responsive controller, a snap acting switch mechanism including, a lever having a pair of lever arms having slots therein each providing a knife edge bearing, a lever of sheet metal having a pair of integrally formed and parallelly disposed lever arms, ears formed integrally with the arms of the sheet metal lever and bent so that the flat sides thereof lie at an angle to the flat sides of the sheet metal lever arms, said ears forming knife edges seated in the knife edge bearings, said slots being arranged for edgewise reception of the ears, each said slot being narrower than the width of said ears.

24. In a thermally responsive controller, a housing including a stationary wall, switch mechanism within the housing carried by the wall, said mechanism including a fulcrum and a removable fulcrum pin carried thereby, said housing including a wall disposed for limiting endwise movement of the fulcrum pin, said last named wall being removable whereby said fulcrum pin may be removed.

25. In a thermally responsive controller, a snap acting switch mechanism including, a lever having a pair of lever arms each providing a knife edge bearing, a lever of sheet metal having a pair of integrally formed and parallelly disposed lever arms, ears formed integrally with the arms of the sheet metal lever and bent so that the flat sides thereof lie at an angle to the flat sides of the sheet metal lever arms, said ears forming knife edges seated in the knife edge bearings, the arms of said sheet metal lever being disposed between the planes of the arms of said first named lever, a third lever having contacts thereon, a pivotal support for said third lever, and a tension spring extending between said third lever and said sheet metal lever.

26. In a thermally responsive controller, a snap acting switch mechanism including, a lever having a pair of lever arms each providing a knife edge bearing, a lever of sheet metal having a pair of integrally formed and parallelly disposed lever arms, ears formed integrally with the arms of the sheet metal lever and bent so that the flat sides thereof lie at an angle to the flat sides of the sheet metal lever arms, said ears forming knife edges seated in the knife edge bearings, the arms of said sheet metal lever being disposed between the planes of the arms of said first named lever, a third lever having contacts thereon, a fixed knife edge bearing support for said third lever, and a tension snap-over spring extending between said third lever and said sheet metal lever.

ESTEL C. RANEY.